United States Patent [19]

Suzuki et al.

[11] 4,014,832
[45] Mar. 29, 1977

[54] HEAT RESISTANT RESIN SOLUTION AND METHOD FOR PREPARATION THEREOF

[75] Inventors: Yasuhiro Suzuki; Toshihide Okamoto; Yuzuru Noda; Makoto Kojima, all of Ibaraki, Japan

[73] Assignee: Nitto Electric Industrial Co., Ltd., Ibaraki, Japan

[22] Filed: Apr. 18, 1975

[21] Appl. No.: 569,427

[30] Foreign Application Priority Data

May 1, 1974 Japan .............................. 49-48277

[52] U.S. Cl. .......................... 260/29.2 N; 260/29.3; 260/29.4 R; 260/37 N; 428/458
[51] Int. Cl.² ........................................ C08G 51/24
[58] Field of Search ....... 260/29.2 N, 78 TF, 78 SC

[56] References Cited

UNITED STATES PATENTS

| | | | |
|---|---|---|---|
| 3,518,219 | 6/1970 | Lavin et al. | 260/29.2 N |
| 3,663,728 | 5/1972 | Hoback et al. | 260/29.2 N |
| 3,673,145 | 6/1972 | Minami et al. | 260/78 TF |
| 3,882,085 | 5/1975 | Schmitt et al. | 260/29.2 N |

*Primary Examiner*—Theodore E. Pertilla
*Attorney, Agent, or Firm*—Sughrue, Rothwell, Mion, Zinn & Macpeak

[57] ABSTRACT

A heat resistant resin solution comprising (1) at least one solvent selected from the group consisting of alcohols, polyhydric alcohols, polyhydric alcohol derivatives, ketones, ethers and esters, (2) aqueous ammonia and (3) a polymer having a residual acid value of about 5 to 40% obtained by reaction of a 1,2,3,4-butanetetracarboxylic acid, an aromatic tricarboxylic acid anhydride and a diamine in the presence of a polyhydric alcohol and a method of preparation of the heat resistant resin solution.

13 Claims, No Drawings

4,014,832

HEAT RESISTANT RESIN SOLUTION AND METHOD FOR PREPARATION THEREOF

BACKGROUND OF THE INVENTION

1. Field of the Invention

This invention relates to heat resistant resin solutions, and, more precisely, heat resistant resin solutions of polymers obtained by reaction of a 1,2,3,4-butanetetracarboxylic acid (hereinafter simply referred to as BTC), an aromatic tricarboxylic acid anhydride and a diamine in the presence of a polyhydric alcohol, the polymer having a residual acid value of about 5 to 40% dissolved in aqueous ammonia and at least one common solvent selected from the group consisting of alcohols, polyhydric alcohols, polyhydric alcohol derivatives, ketones, ethers and esters, as well as to a method for preparation of such resin solutions.

2. Description of the Prior Art

Polyimide resins derived from BTC and a diamine are known as disclosed in U.S. Pat. No. 3,673,145 and Japanese Patent Publication No. 14503/72, and these are polymers having excellent heat resistance. For example, these polymers are useful as films or insulating varnishes. In these polyimide resins, however, the polycarboxylic acid (BTC) component to be reacted with the other diamine component is an aliphatic compound, and therefore, the heat resistance of the obtained polyimide resin, although being relatively high, is inferior to that of aromatic polyimide resins, and in addition, some characteristics of the aliphatic polyimide resins are not very satisfactory in comparison with aromatic polyamideimide resins. For example, when these resins are used as insulating varnishes, the dielectric breakdown voltage of each varnish changes as follows, after heat-treatment for 168 hours at 260° C. In the case of aromatic polyimides and aromatic polyamideimides, the residual value is 90% or more of the initial value, but in the case of polyimides of BTC, the residual value is 70 to 80%. On the other hand, Japanese Patent Publication No. 1797/74, for example, suggests that heat resistant polymers are prepared by reaction of BTC and a tricarboxylic acid anhydride derivative such as phenyl trimellitic anhydride with a diamine, and in preparation of these polymers, solvents of relatively strong polarity such as dimethylformamide, dimethylacetamide, N-methylpyrrolidone or dimethylsulfoxide are essentially used. However, the use of these solvents is not desirable in that an inflammation of the human body results when these solvents contact the body and also in that these solvents have a strong odor and, therefore, it is advisable to avoid the use of these solvents, if possible, and also, particularly, from the standpoint of prevention of air pollution.

SUMMARY OF THE INVENTION

The present invention provides heat resistant resin solutions free from the above-described disadvantage and a method for the preparation of such solutions.

An object of this invention is therefore to prepare polymers having more stable heat characteristics by replacing a part of the BTC with an aromatic ring structure, and more precisely, to provide a method for preparation of solutions of heat resistant resins which are rendered soluble in common solvents such as alcohols, polyhydric alcohols, polyhydric alcohol derivatives, ketones, ethers and esters, by addition of aqueous ammonia to the polymers.

Accordingly this invention provides a method for the preparation of heat resistant resin solutions comprising preparing a polymer having a residual acid value of about 5 to 40% by reacting 1,2,3,4-butanetetracarboxylic acid, an aromatic tricarboxylic acid anhydride and a diamine in the presence of a polyhydric alcohol, and dissolving the polymer in aqueous ammonia and at least one solvent selected from the group consisting of alcohols, polyhydric alcohols, polyhydric alcohol derivatives, ketones, ethers and esters.

A further embodiment of this invention provides a heat resistant resin solution comprising (1) at least one solvent selected from the group consisting of alcohols, polyhydric alcohols, polyhydric alcohol derivatives, ketones, ethers and esters; (2) aqueous ammonia; and (3) at least one polymer having a residual acid value of about 5 to 40% comprising the reaction product of 1,2,3,4-butanetetracarboxylic acid; an aromatic tricarboxylic acid anhydride and a diamine in the presence of a polyhydric alcohol.

DETAILED DESCRIPTION OF THE INVENTION

Most conventional heat resistant resins are soluble only in organic polar solvents which are relatively harmful to the human body, such as dimethylformamide, dimethylacetamide, N-methylpyrrolidone, dimethylsulfoxide, phenol, cresol and xylenol, and extremely few resins which are soluble in common solvents such as alcohols, polyhydric alcohols, polyhydric alcohol derivatives, ketones, ethers and esters exist. Even though some resins are soluble in such solvents, they are polymers produced in an early stage of the polymerization corresponding to monomers or oligomers, and so when these resin solutions are used, for example, as baking varnishes, defects such as a non-uniform surface of the coated film and a non-flexible film occur. Thus, these resin solutions are of little value industrially. Under such circumstances, the present invention is based on the discovery that polymers of a relatively high polymerization degree can be dissolved in the above-described common solvents by addition of aqueous ammonia to the polymers, and thus, the industrial value of the polymers is improved according to the present invention.

In the reaction of BTC, an aromatic tricarboxylic acid anhydride and a diamine in the present invention, the total molar amount of the acid component BTC and the acid anhydride is about 0.8 to 1.5 moles, preferably 0.95 to 1.2 moles, per 1 mole of the diamine component. The proportion of the BTC to the aromatic tricarboxylic acid anhydride is such that the amount of BTC is about 50 to 98 mole %, more preferably 60 to 75 mole %, and the amount of the aromatic tricarboxylic acid anhydride is the balance of 2 to 50 mole %, preferably 25 to 40 mole %.

The thus selected proportion of BTC, aromatic tricarboxylic acid anhydride and diamine are reacted in the presence of a polyhydric alcohol, and the amount of the polyhydric alcohol used is so adjusted that the proportion of BTC, aromatic tricarboxylic acid anhydride and diamine is about 40 to 80% by weight, preferably 60 to 70% by weight, based on the total amount of the entire reaction system (including the polyhydric alcohol). A suitable reaction temperature is about 60° to 230° C, preferably 80° to 180° C. In this reaction, BTC, the aromatic tricarboxylic acid anhydride and the diamine can be reacted at the same time, and alternatively, the following reaction steps are also possible.

BTC and the diamine are previously reacted and then the aromatic tricarboxylic acid anhydride is added to the product and reacted therewith. As another means, the aromatic tricarboxylic acid anhydride and the diamine are reacted previously and then BTC is added and reacted. The degree to which the reaction has progressed can be monitored from the amount of water (as a by-product) and preferably by measurement of the acid value of product. The residual acid value of the product after completion of the reaction is preferably in the range of about 5 to 40%, which may of course be varied in this range, depending upon the use of the product and the amount of the polyhydric alcohol used. The acid value means the mg number of KOH equivalent per carboxylic group in 1 g of sample, and the residual acid value shows the amount (%) of residual acid groups after reaction on the basis of the acid value (100%) of the sample before reaction. The sample employed is the entire system including the polyhydric alcohol.

The thus obtained resin-polyhydric alcohol solution is generally transparent while hot, but after cooling to room temperature (about 20° – 30° C) the solution becomes opaque due to separation of the resin. Such a phenomenon appears more strongly in a project having a residual acid value in the lower portion of the range of about 5 to 40%. However, when aqueous ammonia is added to the system, the solution is no longer cloudy even at room temperature, showing a uniform solution. The thus obtained transparent resin system can be dissolved in the above-described solvents such as alcohols, polyhydric alcohols, polyhydric alcohol derivatives, ketones, ethers and esters or mixed solvents thereof, whereby the heat resistant resin solutions of this invention are obtained.

In the preparation of the heat resistant resin solutions of the present invention, a fundamental element is the use of BTC as one acid component of the starting materials, and the aromatic tricarboxylic acid anhydride component and the diamine component are not specifically limited. Aromatic tricarboxylic acid anhydrides are represented by the following general formula:

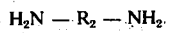

wherein Ar represents a trivalent aromatic group having 6 or more carbon atoms, two bonds of these three bonds of Ar being positioned adjacent each other. More specifically, Ar can be selected from the group consisting of

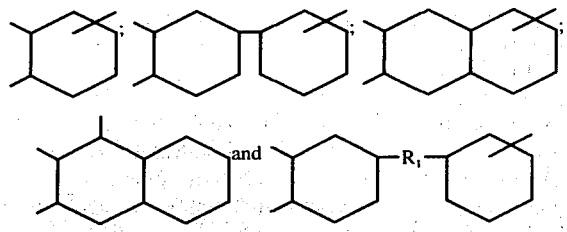

wherein $R_1$ represents —$CH_2$—, —O—, —S—, —$SO_2$—, —CO— or

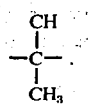

Typical examples of these aromatic tricarboxylic acid anhydrides are trimellitic anhydride, hemimellitic anhydride, 3,4,3' (or 3,4,4')-biphenyltricarboxylic anhydride, 3,4,3' (or 3,4,4')-diphenylmethanetricarboxylic anhydride, 3,4,3' (or 3,4,4')-diphenylethertricarboxylic anhydride, 3,4,3' (or 3,4,4')-diphenylsulfidetricarboxylic anhydride, 3,4,3' (or 3,4,4')-diphenylsulfonetricarboxylic anhydride, 3,4,3' (or 3,4,4')-diphenylketonetricarboxylic anhydride, 3,4,3' (or 3,4,4')-diphenylpropanetricarboxylic anhydride, 2,3,6 (or 2,3,5 or 1,2,4)-naphthalenetricarboxylic anhydride, etc., or a mixture thereof.

As an organic diamine which can be used in the present invention, a diamine compound having the general formula:

$H_2N — R_2 — NH_2$.

wherein $R_2$ represents a divalent aliphatic, alicyclic or aromatic group, is suitable. More specifically, in this formula, $R_2$ can be selected from the group consisting of $(CH_2)_n$ wherein n is an integer of 1 to 11,

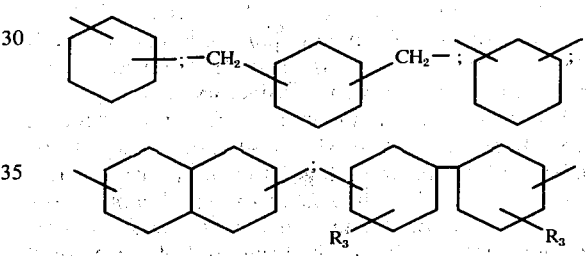

wherein $R_3$ is selected from the group consisting of —Cl, —Br, $CH_3O$—, —$CH_3$ and —$C_2H_5$, and

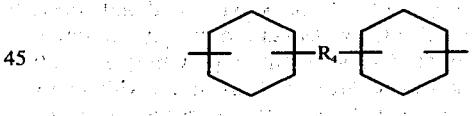

wherein $R_4$ is selected from the group consisting of —$CH_2$—, —O—, —S—, —$SO_2$—, —CO—,

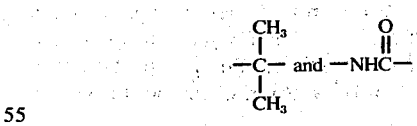

Representative examples of these diamines are ethylenediamine, m-phenylenediamine, p-phenylenediamine, 4,4'-diaminodiphenylmethane, 4,4'-diaminodiphenylethane, 4,4'-diaminodiphenylpropane, 4,4'-diaminodiphenylether, 3,4'-diaminodiphenylether, benzidine, 3,4'-dimethylbenzidine, 1,5-diaminonaphthalene, 2,6-diaminonaphthalene, 4,4'-diaminodiphenylsulfide, 4,4'-diaminodiphenylsulfone, 3,3'-diaminodiphenylsulfone, 3,4'-diaminobenzanilide, m-bis(4-aminophenoxy)benzene, p-bis(4-aminophenoxy)benzene, 4,4'-diaminobiphenyl, m-xylylenediamine, p-xylylenediamine, di(p-aminocyclohexyl)methane, hexamethylenediamine, heptamethylenediamine, octamethylenediamine, nonamethylenediamine, 4,4-dimethylheptamethylenediamine, 3-methoxyheptamethylenediamine, 2,11-diaminododecane, 1,4-diaminocyclohexane, 2,2'-diaminodiethylether, 2,2'-diaminodiethylthioether, 3,3'-diaminodipropoxyethane, 2,6-diaminopyridine, guanamine, 2,5-diamino-1,3,4-oxadiazole, 2-(3'-aminophenyl)-5-aminobenzoxazole, bis(4-aminophenyl)phosphineoxide, bis(4-aminophenyl)diethylsilane, etc., and a mixture thereof. Of these diamines, aromatic diamines are particularly preferred.

The polyhydric alcohol which can be used in the reaction of BTC, the aromatic tricarboxylic acid anhydride and the diamine is a dihydric alcohol or a trihydric alcohol. Representative examples thereof include ethylene glycol, diethylene glycol, triethylene glycol, propylene glycol, dipropylene glycol, neopentyl glycol, glycerin, trimethylol propane, etc.

The solvent, as described above, can be an alcohol, a polyhydric alcohol, a polyhydric alcohol derivative, a ketone, an ether and an ester. Representative examples of solvents are amyl alcohol, hexanol, octyl alcohol, cyclohexanol, methylcyclohexanol, dioxane, ethylene glycol, methyl cellosolve, methyl cellosolve acetate, ethyl cellosolve, ethyl cellosolve acetate, ethylene glycol isopropyl ether, ethylene glycol monobutyl ether, butyl cellosolve, butyl cellosolve acetate, diethylene glycol, methyl carbitol, ethyl carbitol, butyl carbitol, diethylene glycol dimethyl ether, dibutyl carbitol, diethylene glycol acetate, triethylene glycol, triethylene glycol monomethyl ether, propylene glycol, propylene glycol monomethyl ether, propylene glycol monoethyl ether, propylene glycol monobutyl ether, dipropylene glycol, glycerin, glycerin monoacetate, methyl propyl ketone, methyl butyl ketone, methyl amyl ketone, dipropyl ketone, diacetone alcohol, isophorone, cyclohexanone, ethyl acetate, propyl acetate, amyl acetate, etc. In particular, polyhydric alcohols and polyhydric alcohol derivatives are effective. These solvents can be used singly, and, more preferably, two or more solvents are effectively used.

The amount of aqueous ammonia added is preferably as small as possible from the standpoint of the acid value of the polymer obtained, and even if an excess amount of aqueous ammonia is added, the excess can be removed from the system by heating the solution at about 80° to 120° C. However, the addition of too much aqueous ammonia increases the amount of water contained in the resin solution, which is disadvantageous. For example, when this resin solution is used as an enamel for wire by baking in a catalytic combustion baking furnace, water consequently hinders the combustion in the furnace. Accordingly, the amount of aqueous ammonia added is preferably determined so that the content of water in the entire solvent is about 20% by weight or less, more preferably 10% by weight or less.

The resin solutions of this invention can also contain conventional additives which are generally used in wire varnishes and coil impregnating varnishes, such as phenol resins, cresol resins, xylenol resins, melamine resins, titanium chelate compounds, zirconium chelate compounds, etc., whereby coatability of the resin can be increased. These additives are preferably added in a proportion of about 0.5 to 10% to the weight of the resin.

The present invention is explained in greater detail in the following Examples wherein the heat resistant resin solutions of this invention are actually used for the production of enamel wires and the results thereof are shown. Unless otherwise indicated, all parts, percents, ratios and the like are by weight.

EXAMPLE 1

150 g of ethylene glycol and 69.3 g (0.35 mole) of 4,4'-diaminodiphenylmethane were placed in a four neck flask (capacity: 500 ml) provided with a thermometer, a condenser with a trap and a stirrer, and were heated at 80° C. Next, 65.6 g (0.28 mole) of BTC was added thereto and reacted for 30 minutes at 110 ~ 120° C. In the course of the reaction, the reaction system became an opaque light brown system for a time, and afterwards changed to a transparent system. Next, the system was cooled to 70° C and then 13.4 g (0.07 mole) of trimellitic anhydride was added thereto. Afterwards, the system was again heated further and reacted for 30 minutes at 120 ~ 130° C. The residual acid value of the resin solution obtained was 20.2%. The resin solution was opaque at room temperature, but changed to a transparent solution after 10 g of commercial aqueous ammonia (28%) was added thereto to form the ammonium salt of the resin. 90 g of dipropylene glycol was added to finally obtain a transparent brown solution containing a non-volatile content of 36.2% (after heating for 2 hours at 200° C), the viscosity of which solution was 7.4 poise (at 30° C). This solution was baked on a copper wire (diameter: 1.0 mm $\phi$) according to a conventional method in an oven (length: 3 m, temperature: 420° C, wire speed: 4.5 m/min) to prepare an enamel wire, the properties of which are shown below. It is apparent that the prepared enamel wire has excellent mechanical, thermal, electrical and chemical properties.

| | |
|---|---|
| Thickness of Baked Film: | 0.039 mm |
| Flexibility (self diameter winding after 10% elongation): | good |
| Abrasion Wear Test (600 g load): | 103 times |
| Twisting-Peeling Test (span 20 cm): | 79 times |
| Heat Shock Resistance (250° C × 2 hrs): | good in self diameter winding |
| Burn-out Character (under 42A current, 20 sec on, 10 sec off): | 137 cycles |
| Breakdown Voltage (normal state, two wires twisted): | 13.3 kv |
| Breakdown Voltage (treatment at 240° C × 168 hrs, two wires twisted): | 11.8 kv |
| Breakdown Voltage (treatment at 260° C × 168 hrs, two wires twisted): | 11.0 kv |
| $H_2SO_4$ Resistance (S.G. 1.2, 23° C × 24 hr): | 7H or more |
| NaOH Resistance (5%, 23° C × 24 hr): | 5H |
| Benzole Resistance (23° C × 24 hr): | 7H or more |
| Toluol/Ethanol Mixture Resistance | |

| (23° C × 24 hr): | 7H or more |

Remarks:
The information in the parentheses are the conditions employed with the evaluation and H means a pencil hardness.

EXAMPLE 2

150 g of ethylene glycol and 69.3 g (0.35 mole) of 4,4'-diaminodiphenylmethane were placed in a four neck flask (capacity: 500 ml) provided with a thermometer, a condenser with a trap and a stirrer, and were heated at 80° C. Next, 65.5 g (0.28 mole) of BTC was added thereto and reacted for 30 hours at 110° ~ 120° C. In the course of the reaction, the reaction system was an opaque brown system for a time, and afterwards changed to a transparent system. Next, the system was cooled and then 13.4 g (0.07 mole) of trimellitic anhydride was added thereto at 68° C. The solution was further heated and reacted for 1 hour and a half at 120° ~ 130° C, whereby the residual acid value became 19.3%. This system became cloudy when it was cooled to room temperature, and thus did not become transparent. Even when 80 g of butyl carbitol was added to this solution, the solution was still opaque. However, after 10 g of commercial aqueous ammonia (28%) was added thereto while heating at 80~90° C, the solution became transparent even at room temperature. The non-volatile content of the solution obtained (after heating for 2 hours at 200° C) was 35.8% and the viscosity thereof was 15.3 poise (at 30° C). The properties of the enamel wire obtained by baking the solution using a conventional method were substantially the same as those of the Example 1.

EXAMPLE 3

150 g of ethylene glycol and 69.3 g (0.35 mole) of 4,4'-diaminodiphenylmethane were placed in a four neck flask (capacity: 500 ml) provided with a thermometer, a condenser with a trap and stirrer, and were heated at 80° C. Next, 65.5 g (0.28 mole) of BTC was added thereto. After reaction for 30 minutes at 110° ~ 120° C, the reaction system was cooled and 13.4 g (0.07 mole) of trimellitic anhydride was added thereto at 70° C. Afterwards, the system was further heated, and reacted for 90 minutes at 120° ~ 130° C. The residual acid value of the resin solution obtained was 20.7%. When the solution was cooled to room temperature, the solution became cloudy, and the solution was not soluble in dipropylene glycol. The solution was heated at 100° ~ 120° C, and a mixture of 90 g of dipropylene glycol and 10 g of commercial aqueous ammonia (28%) was added thereto and stirred for 1 hour. As a result, a solution which was transparent even at room temperature was obtained (non-volatile content: 37.2%, viscosity: 20.3 poise). The properties of the enamel wire obtained by baking this solution in a conventional method were almost equal to those of Example 1 and Example 2.

EXAMPLE 4

150 g of triethylene glycol, 150 g (0.75 mole) of 4,4'-diaminodiphenylether and 117 g (0.5 mole) of BTC were placed in a four neck flask (capacity: 1 l) provided with a thermometer, a condenser with a trap and a stirrer, and were heated while stirring. After reaction for 30 minutes at 110 ~ 130° C, the reaction system was cooled, and 67 g (0.35 mole) of trimellitic anhydride was added thereto at 65° C. Afterwards, the system was further heated and reacted for 1 hour at 120 ~ 150° C. The residual acid value of the resin solution obtained was 18.2%. The solution was heated at 100° ~ 120° C, and a mixture of 450 g of ethyl carbitol and 20 g of commercial aqueous ammonia (28%) was added thereto and stirred for 1 hour. The thus obtained resin solution (non-volatile content: 32.4%; viscosity: 2.1 poise at 30° C) was transparent even at room temperature. This solution was baked to obtain an enamel wire, similar to Example 1. The properties of the enamel wire obtained are shown below.

| | |
|---|---|
| Thickness of Baked Film: | 0.044 mm |
| Flexibility (self diameter winding after 10% elongation): | good |
| Abrasion Wear Test (700 g load): | 97 times |
| Twisting-Peeling Test (span 20 cm): | 82 times |
| Heat Shock Resistance (250° C × 2 hr): | good in self diameter winding |
| Burn-out Character (under 42A current, 20 sec on, 10 sec off): | 126 cycles |
| Breakdown Voltage (normal state, two wires twisted): | 14.8 kv |
| Breakdown Voltage (treatment at 260° C × 168 hr, two wires twisted): | 13.7 kv |
| H$_2$SO$_4$ Resistance (S.G. 1.2, 23° C × 24 hr): | 7H or more |
| NaOH Resistance (5%, 23° C × 24 hr): | 7H or more |
| Benzole Resistance (23° C × 24 hr): | 7H or more |
| Toluol/Ethanol Mixture Resistance (23° C × 24 hr): | 7H or more |

A Freon resistance test was carried out on the enamel wire obtained in Example 4 and on other conventional wires of urethane modified formal wire, THEIC (tris-(2-hydroxyethyl)-isocyanurate)-modified polyesterimide wire (as disclosed in U.S. Pat. No. 3,426,098) and aromatic polyamideimide wire, for the purpose of comparing the properties of these wires. Two wires each were twisted to form the respective sample. Each of the thus prepared samples was annealed for 1 hour at 150° C, and then treated with a liquid coolant R-22 at 80° C in an autoclave (pressure: about 37 kg/cm$^2$) and left as such for 3 days. Afterwards, the autoclave was cooled with dry-ice-methanol, and the sample was removed and heated at 150° C for 5 minutes. This treatment sequence is one cycle, and after five cycles were repeated for each sample, the dielectric breakdown voltage of each wire was measured. The results obtained are as follows:

| | |
|---|---|
| Formal Wire: | 1.4 kv (residual percentage: 11%) |
| Polyesterimide Wire: | 7.6 kv (residual percentage: 64%) |
| Wire of Example 4: | 13.1 kv (residual percentage: 96%) |
| Aromatic Polyamideimide Wire: | 13.9 kv (residual percentage: 98%) |

It can be seen that the enamel wire obtained using the resin solution of this invention compares favorably with the aromatic polyamideimide coated wire.

In addition, the following phenomena were observed. Due to the heat-treatment carried out after the Freon treatment, the insulating film of the polyamideimide wire deteriorated and became cloudy and dull from the initial cycle, and the insulating film of the polyesterimide wire foamed tremendously covering the entire surface of the film with the repetition of the treatment cycle. However, the wire of Example 4 was neither deteriorated nor discolored, and only a few bubbles appeared on the surface of the film.

As explained above, the heat resistant resin solutions of this invention have excellent thermal, mechanical, electrical and chemical properties, and the industrial uses thereof are broad and important, for example, as varnishes for wires, varnishes for impregnating coils and varnishes for impregnating laminates. In addition, the heat resistant resin solutions of this invention are soluble in solvents which are relatively less harmful to the human body, although most conventional heat resistant resins are soluble only in solvents of strong polarity which are relatively harmful to the human body. Moreover, the present resin solutions can employ water as a solvent together with a neutralizing agent, which broadens the range of uses and applications of the heat resistant resin solutions of this invention.

While the invention has been described in detail and with reference to specific embodiments thereof, it will be apparent to one skilled in the art that various changes and modifications can be made therein without departing from the spirit and scope thereof.

What is claimed is:

1. A method for the preparation of heat resistant resin solutions comprising preparing a polymer having a residual acid value of about 5 to 40% by heat reacting 1,2,3,4-butanetetracarboxylic acid, an aromatic tricarboxylic acid anhydride and a diamine in the presence of a polyhydric alcohol, and dissolving the polymer in aqueous ammonia and at least one solvent selected from the group consisting of monohydric alcohols, polyhydric alcohols, polyhydric alcohol derivatives, ketones, ethers and esters.

2. The method as claimed in claim 1, wherein said aromatic tricarboxylic acid anhydride is represented by the following formula:

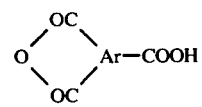

wherein Ar represents a trivalent aromatic group having 6 or more carbon atoms, with two bonds of the three bonds of Ar being positioned adjacent each other.

3. The method as claimed in claim 1, wherein said diamine is an aliphatic diamine, a cycloaliphatic diamine, an aromatic diamine or a mixture thereof.

4. The method as claimed in claim 3, wherein said diamine is an aromatic diamine.

5. The method as claimed in claim 1, wherein said solvent is a polyhydric alcohol, a polyhydric alcohol derivative or a mixture thereof.

6. A heat resistant resin solution comprising (1) at least one solvent selected from the group consisting of monohydric alcohols, polyhydric alcohols, polyhydric alcohol derivatives, ketones, ethers and esters; (2) aqueous ammonia; and (3) at least one polymer having a residual acid value of about 5 to 40% comprising the reaction product obtained by heating of 1,2,3,4-butanetetracarboxylic acid, an aromatic tricarboxylic acid anhydride and a diamine in the presence of a polyhydric alcohol.

7. The heat resistant resin solution as claimed in claim 6, including at least one of a phenol resin, a cresol resin, a xylenol resin, a melamine resin, a titanium chelate compound and a zirconium chelate compound.

8. The method as claimed in claim 1, wherein the total molar amount of the acid component BTC and the acid anhydride is about 0.8 to 1.5 moles per 1 mole of the diamine component.

9. The method as claimed in claim 8, wherein the proportion of the BTC to the aromatic tricarboxylic acid anhydride is such that the amount of BTC is about 50 to 98 mole % and the amount of the aromatic tricarboxylic acid anhydride is the balance of 2 to 50 mole %.

10. The method as claimed in claim 1, wherein the preparation of the polymer is conducted at about 60° to 230° C.

11. The method as claimed in claim 1, wherein the preparation of the polymer is conducted at 80° to 180° C.

12. The method as claimed in claim 10, wherein the amount of the polyhydric alcohol used is so adjusted that the proportion of BTC, aromatic tricarboxylic acid anhydride and diamine is about 40 to 80% by weight based on the total amount of the entire reaction system including the polyhydric alcohol.

13. The method as claimed in claim 11, wherein the amount of the polyhydric alcohol used is so adjusted that the proportion of BTC, aromatic tricarboxylic acid anhydride and diamine is about 40 to 80% by weight based on the total amount of the entire reaction system including the polyhydric alcohol.

* * * * *